(12) United States Patent
McCaffery et al.

(10) Patent No.: US 11,388,195 B1
(45) Date of Patent: Jul. 12, 2022

(54) INFORMATION SECURITY COMPLIANCE PLATFORM

(71) Applicant: ClearOPS, Inc., Scarborough, NY (US)

(72) Inventors: Caroline McCaffery, Scarborough, NY (US); George Rosamond, Scarborough, NY (US)

(73) Assignee: CLEAROPS, INC., Scarborough, NY (US)

(*) Notice: Subject to any disclaimer, the term of this patent is extended or adjusted under 35 U.S.C. 154(b) by 184 days.

(21) Appl. No.: 16/780,459

(22) Filed: Feb. 3, 2020

Related U.S. Application Data

(60) Provisional application No. 62/800,449, filed on Feb. 2, 2019.

(51) Int. Cl.
*H04L 29/06* (2006.01)
*H04L 9/40* (2022.01)

(52) U.S. Cl.
CPC .......... *H04L 63/20* (2013.01); *H04L 63/1425* (2013.01)

(58) Field of Classification Search
CPC .............. H04L 63/20; H04L 63/1425; H04L 2463/101; H04L 2463/102; G06F 21/57; H04W 12/12
See application file for complete search history.

(56) References Cited

U.S. PATENT DOCUMENTS

| | | | | |
|---|---|---|---|---|
| 10,091,227 | B2* | 10/2018 | Merza | G06F 21/552 |
| 10,374,869 | B2* | 8/2019 | Jain | H04L 41/046 |
| 10,447,682 | B1* | 10/2019 | Du Lac | H04L 9/3247 |
| 10,713,655 | B1* | 7/2020 | McClintock | G06Q 20/18 |
| 10,860,721 | B1* | 12/2020 | Gentile | H04L 63/20 |
| 2010/0114634 | A1* | 5/2010 | Christiansen | G06Q 30/018 705/7.28 |
| 2014/0172706 | A1* | 6/2014 | Condry | G06Q 20/4016 705/44 |
| 2015/0189511 | A1* | 7/2015 | Lapidous | H04L 63/0272 726/15 |
| 2017/0006430 | A1* | 1/2017 | Chao | G06Q 30/0261 |
| 2020/0374700 | A1* | 11/2020 | Smith | H04L 9/3247 |

OTHER PUBLICATIONS

Kozlov et al., "The Method of Assessing the Level of Compliance of Divisions of the Complex Network for the Corporate Information Security Policy indicators," 2019 Twelfth International Conference "Management of large-scale system development" (MLSD) Year: 2019 | Conference Paper | Publisher: IEEE.*

Ghannam et al., "Handling malicious switches in software defined networks," NOMS 2016-2016 IEEE/IFIP Network Operations and Management Symposium Year: 2016 | Conference Paper | Publisher: IEEE.*

* cited by examiner

*Primary Examiner* — Roderick Tolentino
(74) *Attorney, Agent, or Firm* — Leason Ellis LLP

(57) ABSTRACT

A computer-implemented system and method are disclosed that monitor and determine vendor compliance with at least some aspects of information and security criteria. At least one computing device is configured by executing code to access information and security criteria respectively associated with a vendor that provides a good and/or service. At least some aspects of the information and security criteria are provided by an organization considering the vendor and, further, the information and security criteria include at least one of cybersecurity criteria, regulatory criteria, intellectual property criteria, data management criteria, and policy criteria.

18 Claims, 12 Drawing Sheets

400

Your Vendors

Look up Vendor and save it to your Vendors list. Then all alerts for that vendor will appear here.

Look up a Vendor

Enter one or both of the following fields

*Company Name*

*Website URL*

Search

INFORMATION SECURITY COMPLIANCE PLATFORM

CROSS-REFERENCE TO RELATED PATENT APPLICATIONS

This application is based on and claims priority to U.S. Provisional Patent Application 62/800,449, filed Feb. 2, 2019, the entire contents of which is incorporated by reference herein as if expressly set forth in its respective entirety herein.

FIELD

The present disclosure is directed, generally, to information and security compliance and, more particularly, to vendor compliance.

BACKGROUND

Many companies use vendors to carry out and manage portions of their business. Vendors, typically suppliers of goods and services, can supply these goods and services locally or remotely via a communications network. For example, companies may use vendors to manage the payroll, human resources, or data storage aspects of its respective business. These management services can be conducted by remotely accessing data of the company and processing such data according to the needs of the company. Off-loading particular aspects of a business to third-party vendors can often result in increased efficiency and profit for the company.

The process of entering into agreements with such vendors itself is an inefficient, time-consuming and expensive process. For example, companies often need to conduct due diligence or reviews of each vendor before, during or after entering into a business arrangement with the vendor. Evaluating the fitness or suitability of a vendor can introduce significant delays in executing the business relationship.

In part, this delay comes from the customer's own risk management and compliance procedures. An aim of risk management and compliance procedures is to determine what risks the vendor presents to the company. For example, where a customer is seeking a vendor to process data for the customer's own clients, the risk management and compliance procedures are used to determine if the vendor is compliant with various industry standard information security practices. In the past, failure to properly evaluate the operational practices of vendors has resulted in the customer facing data breaches or allegations of consumer protection law violations. Such breaches can cost the customer money and reputational harm.

It is recognized herein that delays associated with vendor compliance are further compounded when a customer utilizes the services of multiple vendors, or when vendors themselves utilize the services of multiple vendors. A customer is faced with the possibility of spending significant time and money in evaluating vendors. Alternatively, customers may only focus oversight and evaluation efforts on the most critical or high value vendors. Such an approach can result in cost savings, but with a corresponding increase that risks posed by the vendor go unnoticed until it is too late.

Thus, what is needed in the art are systems, methods and computer products that permit customers, agencies, vendors, and other interested parties to evaluate the operational, information and security practices of various vendors. Furthermore, what is needed in the art are fully implemented solutions that allow customer evaluate a vendor, and if necessary, prevent the vendor from receiving customer data if the vendor fails to use proper information security procedures and practices.

BRIEF SUMMARY

A computer-implemented system and method are disclosed that monitor and determine vendor compliance with at least some aspects of information and security criteria. In one or more implementations, at least one computing device is configured by executing code to access information and security criteria respectively associated with a vendor that provides a good and/or service. At least some aspects of the information and security criteria are provided by an organization considering the vendor and, further, the information and security criteria include at least one of cybersecurity criteria, regulatory criteria, intellectual property criteria, data management criteria, and policy criteria. In one or more implementations, the at least one computing device is further configured to access a plurality of remotely located computing devices to obtain information associated with the vendor's performance in connection with the at least some of the aspects of the information and security criteria. Further, the at least one computing device is further configured to automatically evaluate the vendor's compliance with at least some of the aspects of the information and security criteria. The evaluating can include comparing a predetermined standard or threshold of at least one of the aspects of the information and security criteria and at least some of the information obtained from the plurality of remotely located computing devices. Furthermore, the at least one computing device can be further configured to automatically determine, as a function of the evaluating, that the vendor has not complied with a first subset of the aspects of the information and security criteria, wherein the first subset includes at least one of the aspects of the information and security criteria. Still further, the at least one computing device can be further configured to automatically determine, as a function of the evaluating, that the vendor has complied with a second subset of the aspects of the information and security criteria, wherein the second subset includes at least one other of the aspects of the information and security criteria. Moreover, the at least one computing device can be further configured to determine, based at least on an evaluation of the first subset and the second subset, whether the vendor is in compliance or is out of compliance with the information and security criteria.

These and other aspects, features, and advantages can be appreciated from the accompanying description of certain embodiments of the invention and the accompanying drawing figures and claims.

BRIEF DESCRIPTION OF THE FIGURES

Further aspects of the present disclosure will be more readily appreciated upon review of the detailed description of its various embodiments, described below, when taken in conjunction with the accompanying drawings, of which:

FIGS. 3-12 illustrate example data entry display screens in accordance with one or more example implementations of the present disclosure.

DETAILED DESCRIPTION OF ONE OR MORE EMBODIMENTS

Figure 1:
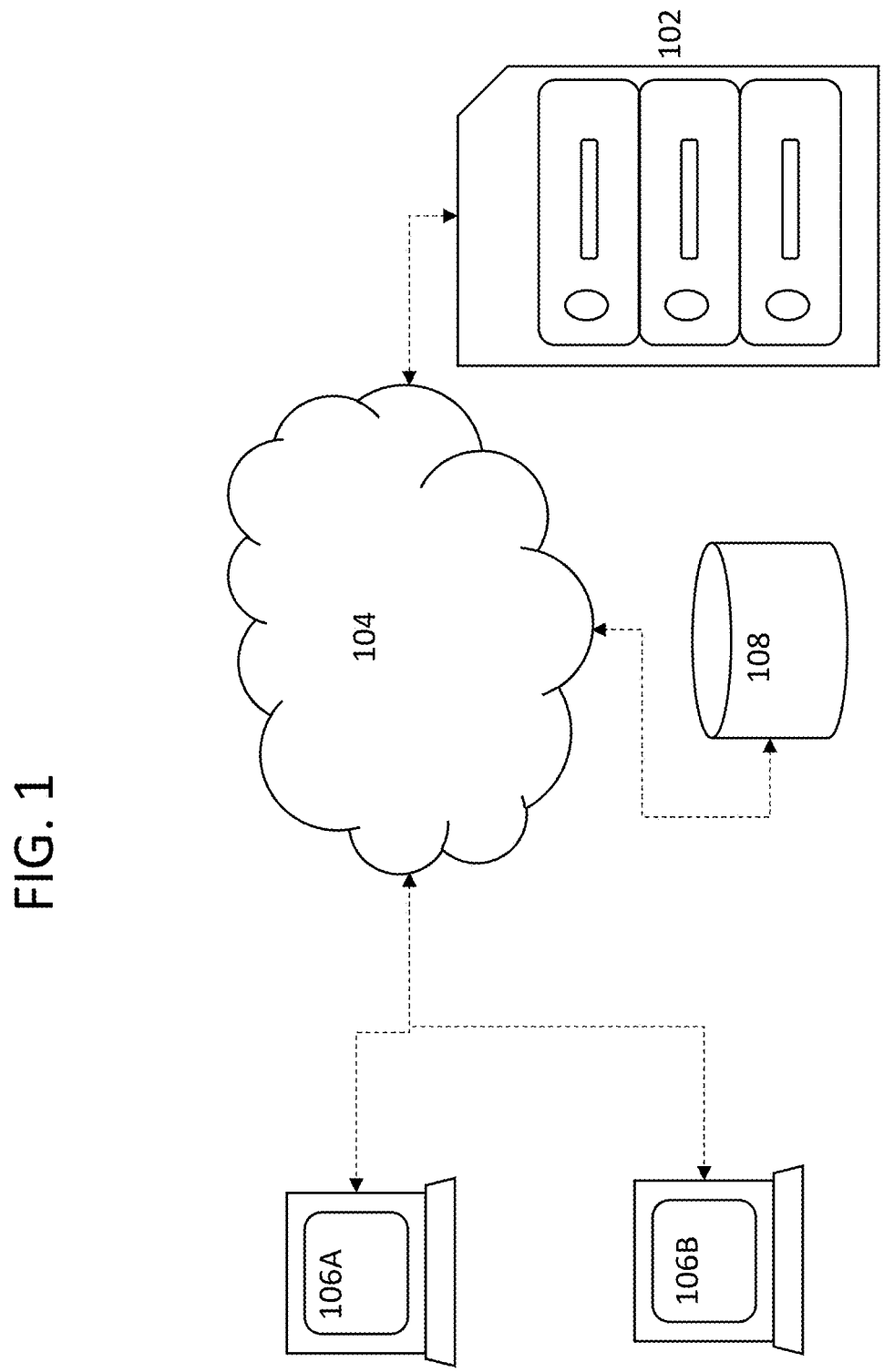
FIG. 1 illustrates a schematic block diagram of devices and components in accordance with one aspect of the present disclosure.

By way of overview and introduction, there exists a need to obtain accurate information about vendor-related security and information handling practices to make decisions on which vendors to use and in what capacity. Present solutions require significant investigation, such as responses to lengthy questionnaires and documentation, that take too long to review and process, thus holding up the process of contracting with vendors. Unfortunately, failing to evaluate the information criteria, such as cybersecurity and privacy, for any given vendor can have extremely negative consequences. For instance, the lack of vendor diligence can expose a company to fines or reputational harm for failure to ensure that sensitive (e.g., privacy) information remained secure. Furthermore, present solutions often employ proprietary and hidden algorithms to provide scores, such as credit scores. The present disclosure improves upon such solutions by being transparent about the data points that are discovered and employed in accordance with the teachings herein. Moreover, providing access to respective information used for various calculations enables customers to verify data independently, which has heretofore been unavailable.

The systems, methods and computer products described herein address drawbacks that are inherent to traditional evaluation of third party vendors. For example, the present application includes systems and methods to access information regarding security posture and related criteria for various vendors and, thereafter, processing that information in a manner that allows improved speed and resource use relative to existing solutions. Accordingly, the systems, methods and computer products described herein can operate to cause a computer or software platform to utilize fewer resources in the course of evaluating a compliance state of one or more vendors, while also achieving improved results relative to existing implemented systems.

More particularly, the systems, methods and computer products described herein are directed to identifying public and/or private information security and other criteria that are relevant to one or more vendors that provide a good or service. The identified information and security criteria are then used to determine the compliance state of a specific vendor. For instance, the vendor operational or information security practices are evaluated against a list of attributes. The results of this evaluation are used to determine if the vendor is compliant with information and security criteria, or a portion thereof, relevant to a customer, agency or other party. By comparing the information security data for a specific vendor against the one or more standards, regulations or policies for information security, an accurate and transparent determination regarding the vendor information security practices can be obtained. Thus, the systems, methods and computer products described are directed to a specific application that allows for rapid assessment of a vendor's information security practices and thus enables customer and vendors to confidently enter into commercial relationships therewith.

The systems, methods and computer products shown and described herein provide an improvement in compliance determination technology, including by contextualizing the information and security criteria so that only those criteria that are relevant or responsive to a given vendor of a specific type are evaluated. Through standardizing types of the information and security criteria, a full picture assessment of the vendor's compliance state is achieved. As provided in more detail herein, the information and security criteria used to evaluate the vendor can include a number of different categories, including: cybersecurity criteria, regulatory criteria, intellectual property criteria, data management criteria and policy criteria. One particular approach determines vendor compliance with each of the plurality of the identified information and security criteria. However, in an alternative approach contextual information is used to identify a subset of the information and security criteria that is relevant and responsive to the type of vendor being evaluated. For instance, data relating to the vendor can be queried from databases. Public registries and other public data stores can be queried, for example, using contextual data, to determine if a respective vendor is compliant with the various information and security criteria. The systems and methods here include technologies to access various data sources to evaluate vendors, which eliminates or otherwise reduces labor intensive data acquisition, reduces error rates, and provides more granular information beyond ambiguous qualifier statements, which provides the ability to independently verify or validate the information security status of a vendor.

Based on results of an evaluation data, such as returned from one or more executed queries, a vendor can be flagged as compliant or non-compliant with customer specific, industry specific, or mandated information security practices. Likewise, specific shortcomings in connection with a vendor's non-compliance can be identified and one or more processes can be implemented to resolve such non-compliance. Such processes can depend, for example, on the degree and severity of respective non-compliance. For example, automatic notification procedures can be implemented to resolve non-compliance. More aggressive actions, such as to automatically implement corrective measures, can be taken in other contexts. For example, specific details associated with a status of non-compliance of the vendor can be used to revoke or temporally suspend the vendor's access pending one or more remediation actions. In a further example illustrating an extreme case, a vendor may be determined to be non-compliant and a domain name reference to the vendor is deleted or altered to as to prevent public access to the network domain of a non-compliant vendor.

Referring now to the drawings and turning to a particular configuration of the systems, methods and approaches described herein, FIG. 1 is a system diagram representing an information security compliance platform in accordance with an implementation of the present application. A compliance platform 102 is shown, which can include one or more computing device(s), and configured to communicate over a network 104 with one or more databases and one or more remote computer device(s) 106. In one example, a customer wishing to evaluate various vendors uploads, transmits, provides access or otherwise makes available a list of venders to the compliance platform 102.

Figure 2:
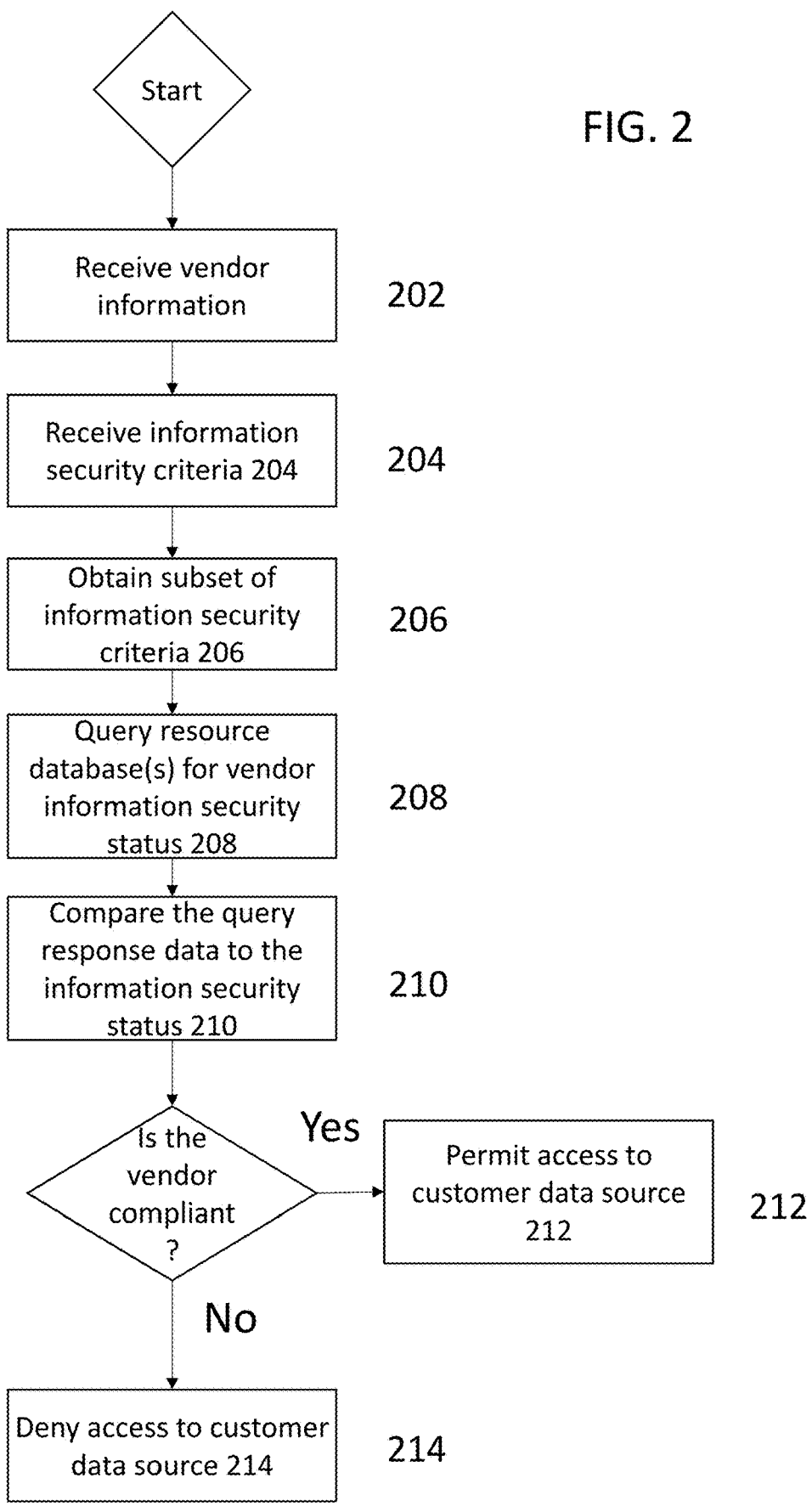
FIG. 2 provides a flow diagram in accordance with one aspect of the present disclosure.

FIG. 2 illustrates an example series of steps that can be executed in accordance with an example the compliance platform 102. Platform 102 can be configured by one or more modules to receive vendor information as shown in step 202. In a more detailed example the compliance platform 102 can be configured, such as by one or more modules operating or executing as code therein, to identify search parameters and/or data storage locations for use in accessing operational criteria for a respective vendor. For instance, the compliance platform 102 is configured to transform or utilize a given vendor name to determine the network identity, address or footprint of a vendor. Such a network identity can include a website used by the vendor, one or more domains associated with the vendor, and/or one or more network accessible application user interfaces associated with the vendor. By way of example, where a vendor is XYZ LLC, identifying the XYZ network identity includes determining the existence of one or more websites owned by XYZ LLC, such as but not limited to XYZ.com, or another domain. In another configuration, the identification of the vendor is received by the user. For example, a user of the platform 102 uses one or more user interfaces to submit or enter a vendor name as well as the network identity of the vendor.

Continuing with the flow diagram of FIG. 2, the compliance platform 102 is utilized to receive or identify a list or collection of the information and security criteria that is relevant for a given vendor, customer or agency as shown in step 204. For instance, different customers may have different vendor requirements. In such scenarios, the compliance platform 102 is configured by one or more software modules to access a list of the information and security criteria from a datastore for evaluation.

By way of further example detail, using a supplied list of vendors, the compliance platform 102 can be configured to evaluate the information and security criteria of the vendor to determine compliance of the information and security criteria with an information security compliance standard or threshold. By way of non-limiting example, the information and security criteria can include any operational status, standard, criteria, or configuration of the vendor's business activities, network footprint, contractual obligation or presence or public statement. For instance, the information and security criteria can include at least one of cybersecurity criteria, regulatory criteria, intellectual property criteria, data management criteria and policy criteria.

Cybersecurity criteria can relate to whether a vendor has a secure network presence. For instance, the cybersecurity criteria can include information regarding an encryption status of a vendor website or application programming interface (API). In a more detailed evaluation, cybersecurity criteria can also include information regarding the SSL status of the vendor's website. Furthermore, cybersecurity criteria can concern information about the verification and authentication status of a vendor website. For instance, the cybersecurity criteria include information relating to whether domain name service ("DNS") security protocols have been enabled for the vendor website. In another configuration, the cybersecurity criteria include information regarding the Sender Policy Framework (SPF) of the vendor e-mail server. For instance, cybersecurity criteria information can include information representing a determination of whether methods used by the vendor's email server are capable of detecting forged sender addresses.

While cybersecurity criteria can relate to one or more network protocols used to exchange data between computers, the cybersecurity criteria can also include other information, such as a location of the vendor's domain name registration. Such cybersecurity criteria can further include information regarding the versions of the software used by the vendor and if the relevant patch or updates have been applied.

Furthermore, the information and security criteria can include, for example, regulatory criteria. Such regulatory criteria can include information on vendor activities that are governed by federal, state, or local governmental laws or regulations. For instance, regulatory criteria can include information representing a determination of whether the vendor's operational practices are appropriate under the General Data Protection Regulation (GDRP). Likewise, the vendor's compliance under other local regulations or laws, such as (for non-limiting examples), HIPPA, COPPA, FINRA, CCPA, and CAN-SPAM, can also be incorporated into the regulatory criteria component of the information and security criteria.

In one or more further configurations, the information and security criteria can also include information associated with intellectual property. For example, intellectual property criteria can include information regarding one or more licenses or other intellectual property rights that are utilized by the vendor in operation of the vendor's business. Information regarding any open-source software or general public license (GPL) covered software, for example, can be included in the intellectual property rights criteria. Such intellectual property rights criteria can, in one or more arrangements, can include information on any patents, trademarks, or other intellectual property rights that are applicable to goods and/or services that are delivered by a vendor to a customer.

Moreover, data management criteria can include information relating to data that are provided to or accessed by a vendor, and how data are managed and/or handled. For example, data management criteria can include information representing a determination of whether data are stored in redundant back-ups, in encrypted form, and in particular storage location(s), subject to various criteria, such as a particular legal regulation.

Moreover, policy management criteria can include information relating to the existence and or compliance of a vendor with one or more operational policies that the vendor has drafted or implemented. For example, the policy management criteria include information representing a determination vendor compliance with one or more terms of service or terms of use, privacy policy, data use policy, customer agreement and end-user license agreement. The present application includes one or more implementations that are focused heavily on supporting privacy of information, including as a function of various technical and policy-based security measures. Moreover, the present application can include one or more modules to evaluate whether a website is properly collecting consent from its users, whether membership is in place for third-party privacy monitoring (e.g., PRIVACY SHIELD), whether and how many data breaches have occurred or that a vendor has had, and whether alerts can be timely provided in response to new breaches.

In a particular implementation, information and security criteria, or information necessary to evaluate the information and security criteria as described herein is stored in one or more database or data storage locations. For instance, with respect to FIG. 1, the information criteria used to evaluate a vendor is stored in database 108 that is accessible to the software platform 102 via a network 104, such as the internet.

Returning to FIG. 2, while the compliance platform is configured to receive a complete list of attributes, such as relating to the information and security criteria, each specific attribute may not be relevant or needed for a given vendor. As such, for each received and identified vendor a respectively defined set of information and security criteria can be generated. For example, where large organizations have different classes of vendors (e.g., human resources, accounting, technology, or the like), different collections of information and security criteria are defined which are relevant for efficient processing of the vendor. In one or more implementations, each vendor is assigned a type or category of vendor. Using the category, the relevant information and security criteria for the vendor is accessed. For example, a database, such as database 108, is queried for the information and security criteria associated with a given vendor type. Alternatively, a given vendor has a specific set of the information and security criteria associated with that vendor. Here, a query to identify the vendor from a vendor database returns a defined set of the information and security criteria associated with the given vendor. As shown in FIG. 2, the compliance platform 102 is configured by one or more modules to obtain a subset of the information and security criteria used to evaluate a given vendor as shown in step 206.

Once the information and security criteria associated with the vendor is accessed, the compliance platform 102 can be configured to access one or more databases 108, services, remote computers, or information stores (including remote computer 106), to determine vendor compliance in connection with the information and security criteria. In a particular configuration, such as represented in FIG. 2, the compliance platform 102 is configured by one or more modules to query data stores for data regarding the information security posture of a given vendor (step 208). Such query can be conducted on an on-demand basis, or on a periodic schedule, or some combination thereof. For instance, one or more DNS servers (such as a DNS host server 106A) are queried by the compliance platform 102, or a processor configured by one or more modules thereof. In a particular configuration, the query includes the domain name used by the vendor. The response to the query includes data values corresponding to particular information and security criteria relevant to cybersecurity posture of the vendor. In an alternative configuration, the query parses the web domain such as hosted by web host server 106B) of the vendor for one or more privacy policies or terms of use. In another configuration, the compliance platform queries a vendor website host to determine if the queried website has SSL enabled, the website's DNS security status, and the status of the associated DNS record associated record.

As shown in step 210 of FIG. 2, response data are obtained from the one or more queries and are compared to a threshold value, status or value, which is indicative of compliance with the information and security criteria. For example, the information and security criteria for a given vendor includes information on whether the vendor website transfers data in an encrypted state. The compliance platform evaluates the query response to determine if, in fact, the vendor website does transfer data in the encrypted state. If true, the vendor is deemed compliant with that particular aspect of the information and security criteria. This process can occur iteratively, in parallel, and partially and/or completely, depending on a particular implementation, for the information and security criteria associated with the given vendor to be evaluated.

In a further configuration, one or more contextual modules configure the compliance platform 102 to evaluate the text of the privacy policy, license or other document provided by the vendor to determine salient characteristics, features or statuses relevant to the information and security criteria. For instance, the privacy policy for a given vendor is accessed from the vendor's web host. The accessed privacy policy can be parsed, for example, using one or more text processing or natural language processing modules to determine if the policy includes specific provisions or statements relevant to the information and security criteria.

Data obtained for a given vendor can be compared to one or more relevant thresholds, values or statuses, to determine whether the vendor is compliant with the information and security criteria. Where a vendor has previously been evaluated by the compliance platform 102, the vendor's record can be updated to represent a current evaluation status. Alternatively, multiple versions of the vendor's compliance status can be stored along with metadata indicating the date and/or time when evaluation was conducted.

The results of the information and security criteria evaluation can be stored and made accessible to a customer, agency or other interested party. For example, a customer wishing to execute a contract with a given vendor is provided an interactive graphical user interface that indicates the evaluated information and security criteria, the vendor's compliance state relative to the evaluated information and security criteria, the relevance of the information and security criteria evaluated, and any comments, notes or metadata associated therewith.

Depending on a particular outcome of the information and security criteria evaluation of step 210, the compliance platform 102 can be configured to either permit the vendor to access data from a customer-controlled data source or deny access to the customer-controlled data source. For instance, as shown in step 212, where the vendor has been evaluated as compliant with the information and security criteria, the vendor is granted access to customer-controlled data. For example, where a vendor is processing payroll for a customer, upon a determination of compliance, the vendor is given API keys to access the payroll database of a specific customer. In another arrangement, where the vendor is in a pre-existing relationship with the customer, a determination of compliance will cause the access previously granted to the customer data to be maintained.

In an alternative configuration, where the evaluation of the information and security criteria indicates that a vendor is non-compliant with the one or more information and security criteria, the vendor can be denied access to the customer-controlled data, as in step 214. For instance, the compliance platform 102 is configured to revoke API keys associated with a vendor that is non-compliant. In an alternative configuration, the compliance platform 102 causes the DNS registration or domain access of the vendor to be suspended. Alternatively, the compliance platform 102 is configured to disable public access to the vendor domain until a subsequent evaluation indicates that the vendor is complaint with all the information and security criteria.

In a further configuration, the software platform can be configured to send a message to a non-compliant vendor, where the message includes data relating to the non-compliant status. In a further implementation, the message also includes data or information indicating or suggesting remediation of the non-compliant status. In a further implementation, the message includes an interactive feature or functionality that causes a message to be sent back to the compliance platform 102, wherein the return message includes an indication that an attempt at remediation of the non-compliant status has been undertaken. In turn, upon receiving the return message, the compliance platform 102 re-evaluates the vendor's information security posture to determine if the vendor is compliant. This process can proceed iteratively until it is complete and/or otherwise terminated.

FIGS. 3-12 illustrate example data entry display screens associated with one or more example implementations of the present disclosure. The data entry display screens illustrated in FIGS. 3-12 include interactive graphical screen controls that enable users to identify attributes and characteristics associated with various vendors, provide for internal notes and communications, including to promote cross-functional collaboration and record keeping. Moreover, the present disclosure includes features for recommendations and suggestions for additional inquiries that a user may seek to collect from a vendor, and to receive periodic and current updates and notifications.

Figure 3:
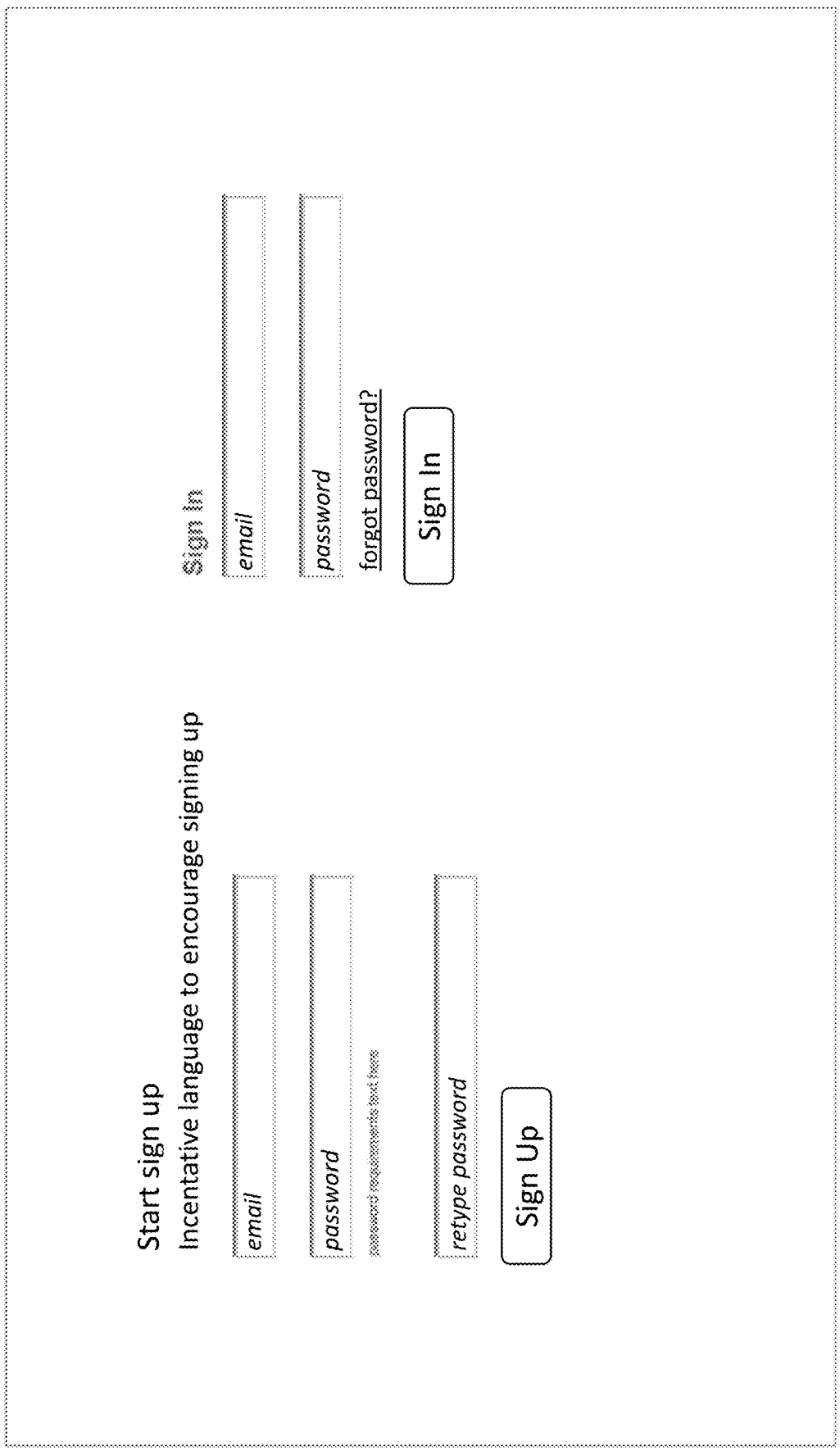

FIG. 3 illustrates an example display screen that is provided for a new user to register with a proprietor of the present disclosure, or for registered users to provide security authorization and to sign in to access features shown and described herein.

FIGS. 4-7 illustrate a sequence of example data entry display screens provided for a user to identify and select a vendor (data entry screen 400, FIG. 4). Platform 102 processes information associated with one or more selected vendors and provides information associated in a table format (data entry screen 500, FIG. 5). Information, such as a most recent time when a user logged into platform 102, and/or an internet protocol ("IP") address of a device used for logging in can be provided. Further, a graphical screen control can be provided for sorting information provided in display screen 500, such as by company name or other criteria. In the example shown in FIG. 5, table 502 lists vendors and includes various kinds of information such as name, status information and description, and whether there have been changes to an account and a level of severity or urgency associated with any change. In addition, graphical screen controls can be provided in table 502 for a user to add or edit notes, and to submit additional details regarding a company and/or to delete a company from the table 502.

Figure 5:
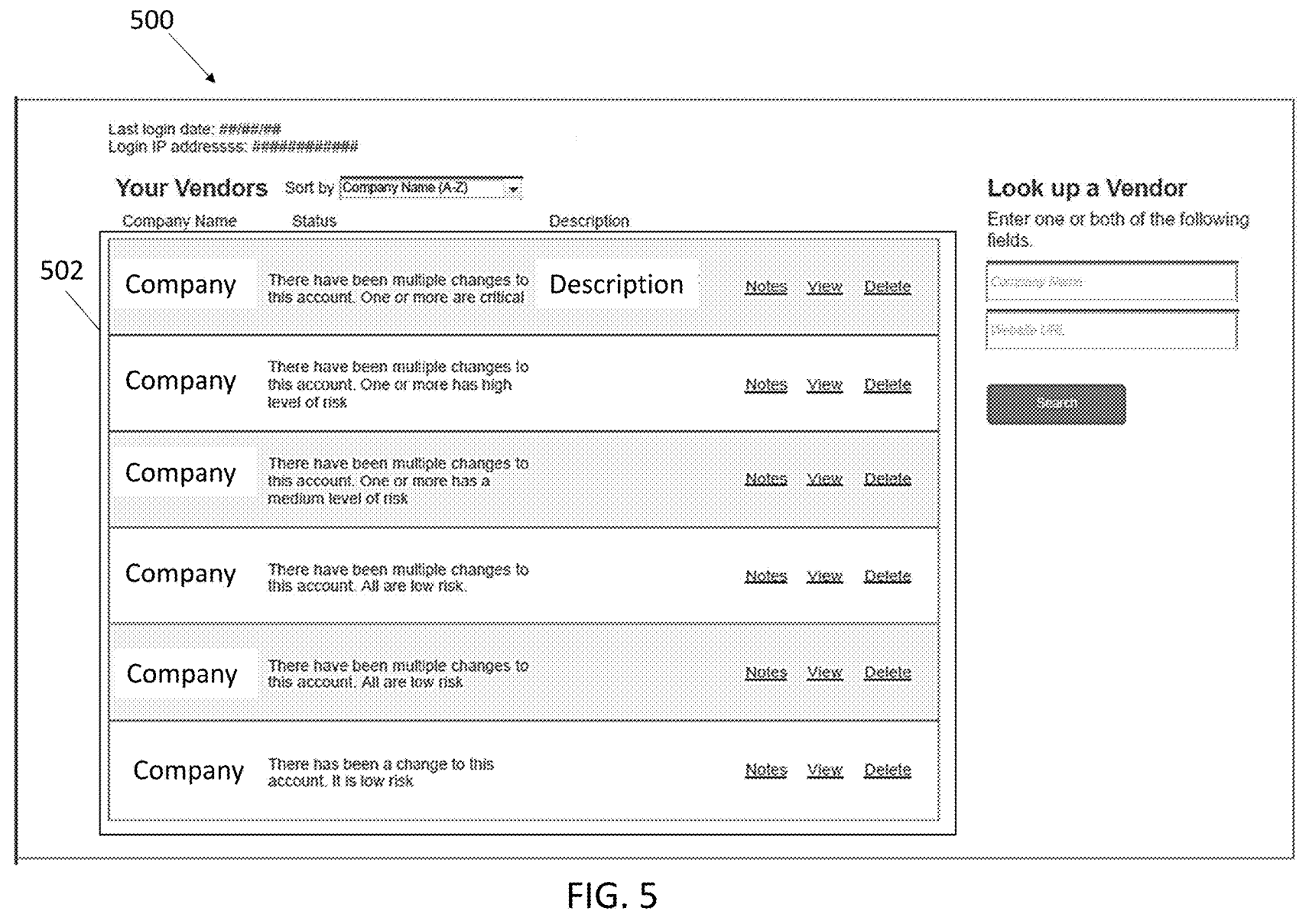
Figure 6:
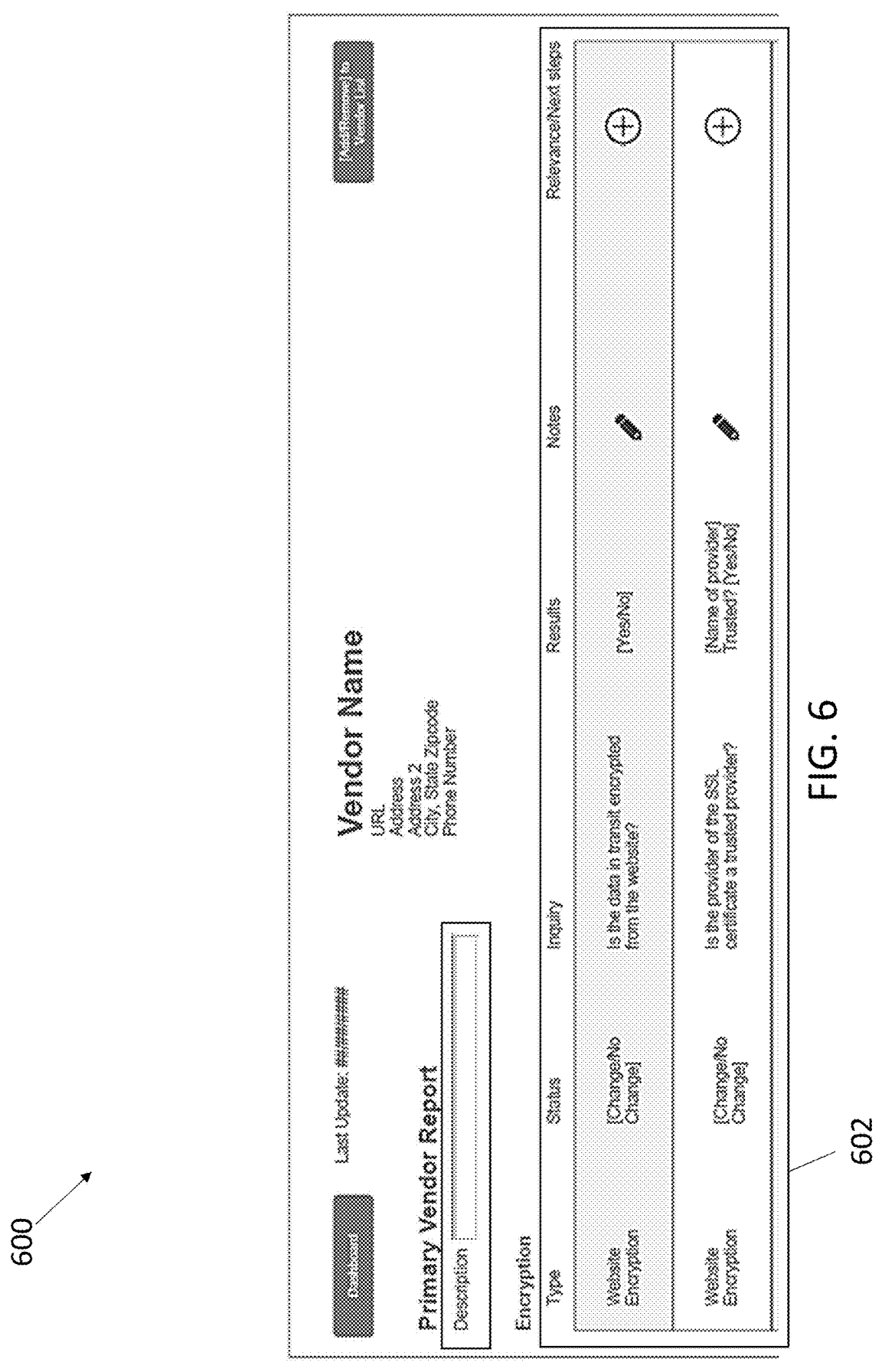

FIG. 6 illustrates an example data entry display screen 600 that provides information associated with a vendor that has been selected from table 502 (FIG. 5). In the example shown in FIG. 6, information associated with a vendor's demographics and contact information is provided. Additionally, encryption data ("Type") are provided, as are "status," "inquiry," and "results." For example, information can be listed in table 602, such as whether data in transit are encrypted or whether the provider of a secure sockets layer certificate is a trusted provider. Moreover, results are provided ("yes/no"), as well as detailed information associated with a respective inquiry. Further, graphical screen controls are provided for a user to add or edit notes as well as to receive information associated with additional ("next") steps.

Figure 7:

FIG. 7 illustrates an example data entry display screen 700 that provides communication access to vendors, which users can use to verify information. In the example shown in FIG. 7, various columns provide for a verification type that identifies an emailer or sender verification, whether there has been a status change or no change, a respective inquiry for the vendor (such as whether a vendor uses SPF, DKIM record, and/or DMARC). Further, results of an inquiry can be provided, as well as graphical screen controls for a user to add or edit notes associated with the verification.

Figure 8:
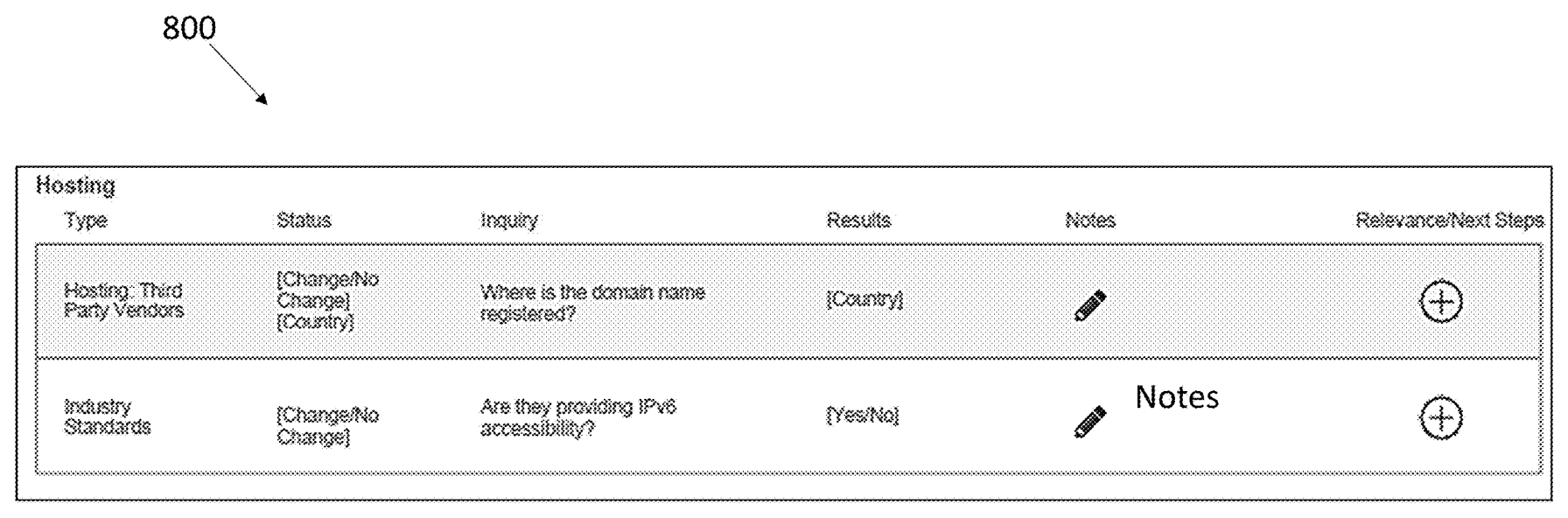

FIG. 8 illustrates an example data entry display screen 800 that provides information associated with hosting, such as for a third-party applying particular types of encryption and complying with an industry standard. Similar to data entry display screen 700, columns are provided in display screen 800 for type, status, inquiry, results, notes, and relevance/next steps.

Figure 9:
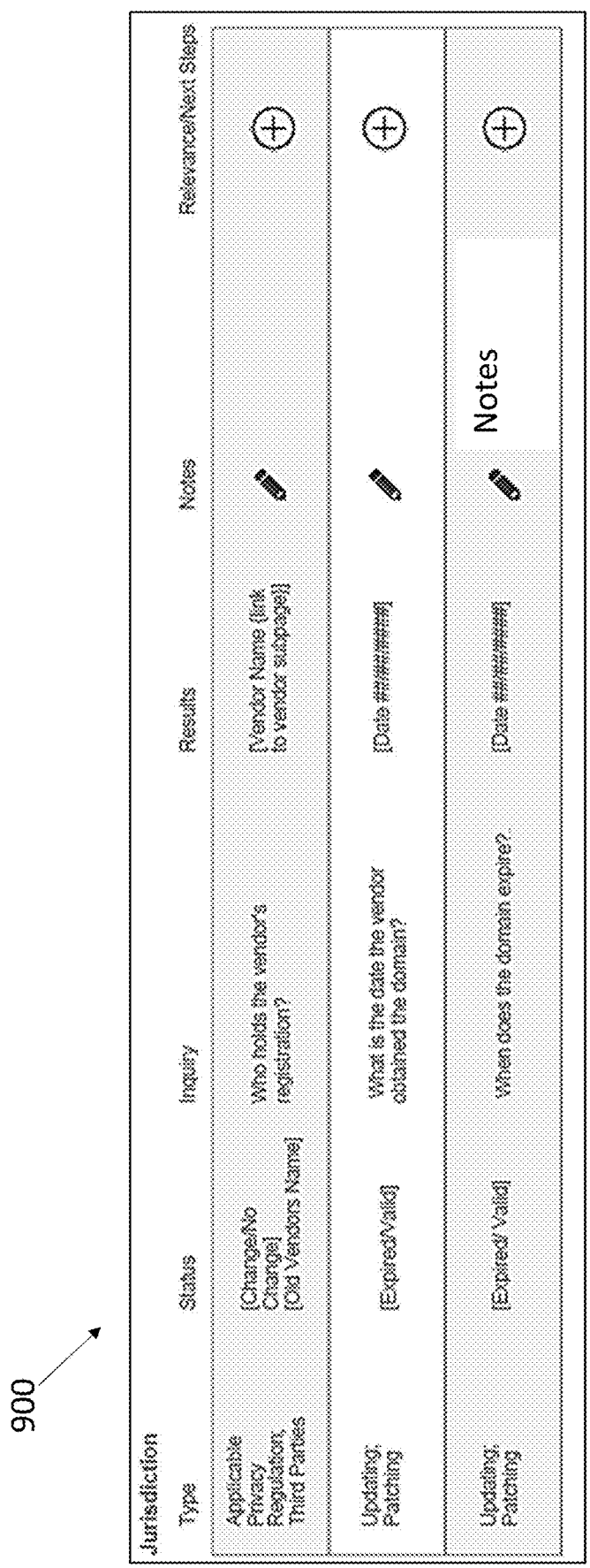

FIG. 9 illustrates an example data entry display screen 900 that provides a table enabling a user to identify jurisdiction requirements, such as with regard to applicable privacy regulations, updates, patches or the like. Similar to display screens 700 and 800, display screen 900 includes columns for type, status, inquiry, results, notes, and relevance/next steps.

Figure 10:
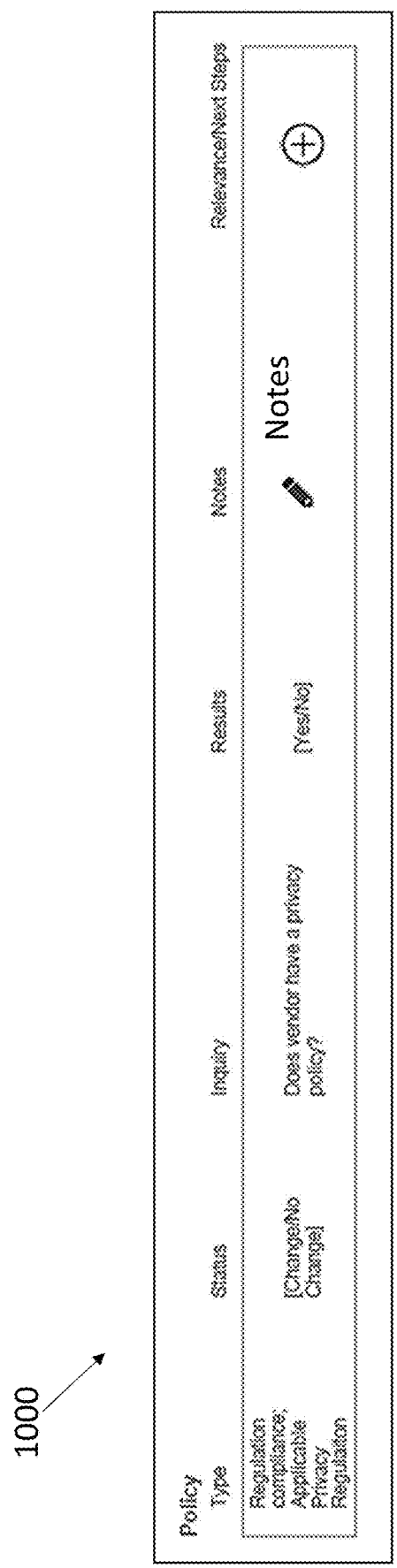

FIG. 10 illustrates an example data entry display screen 1000 that provides a table showing information associated with vendor policy. For example, information is provided to show whether there is appropriate regulation compliance or whether there are applicable privacy or other regulations that are being followed by a respective vendor. As with display screens 700 and 800, information is provided in display screen 1000 to identify a type, status, inquiry, results, notes, and relevance/next steps.

Figure 11:
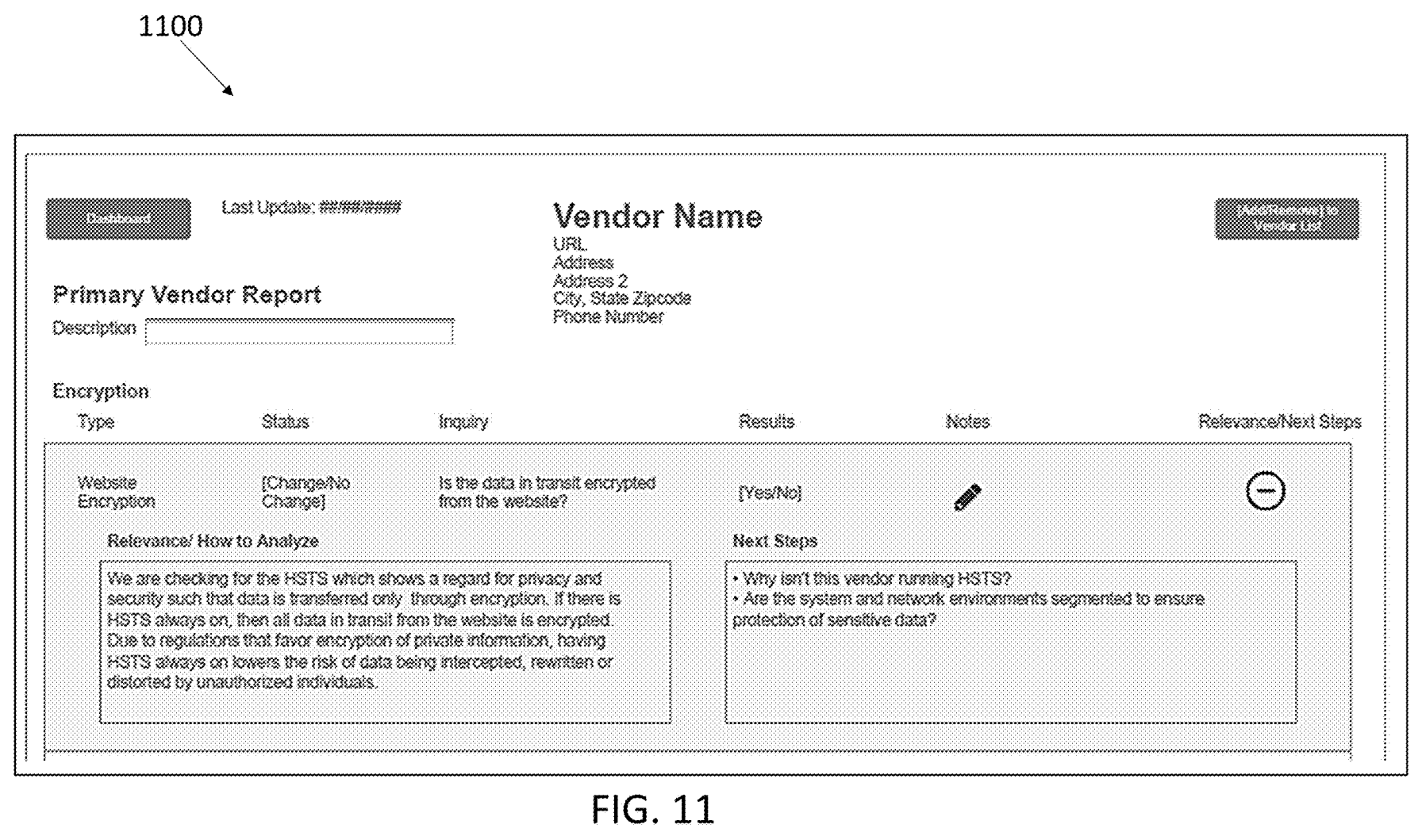
Figure 12:
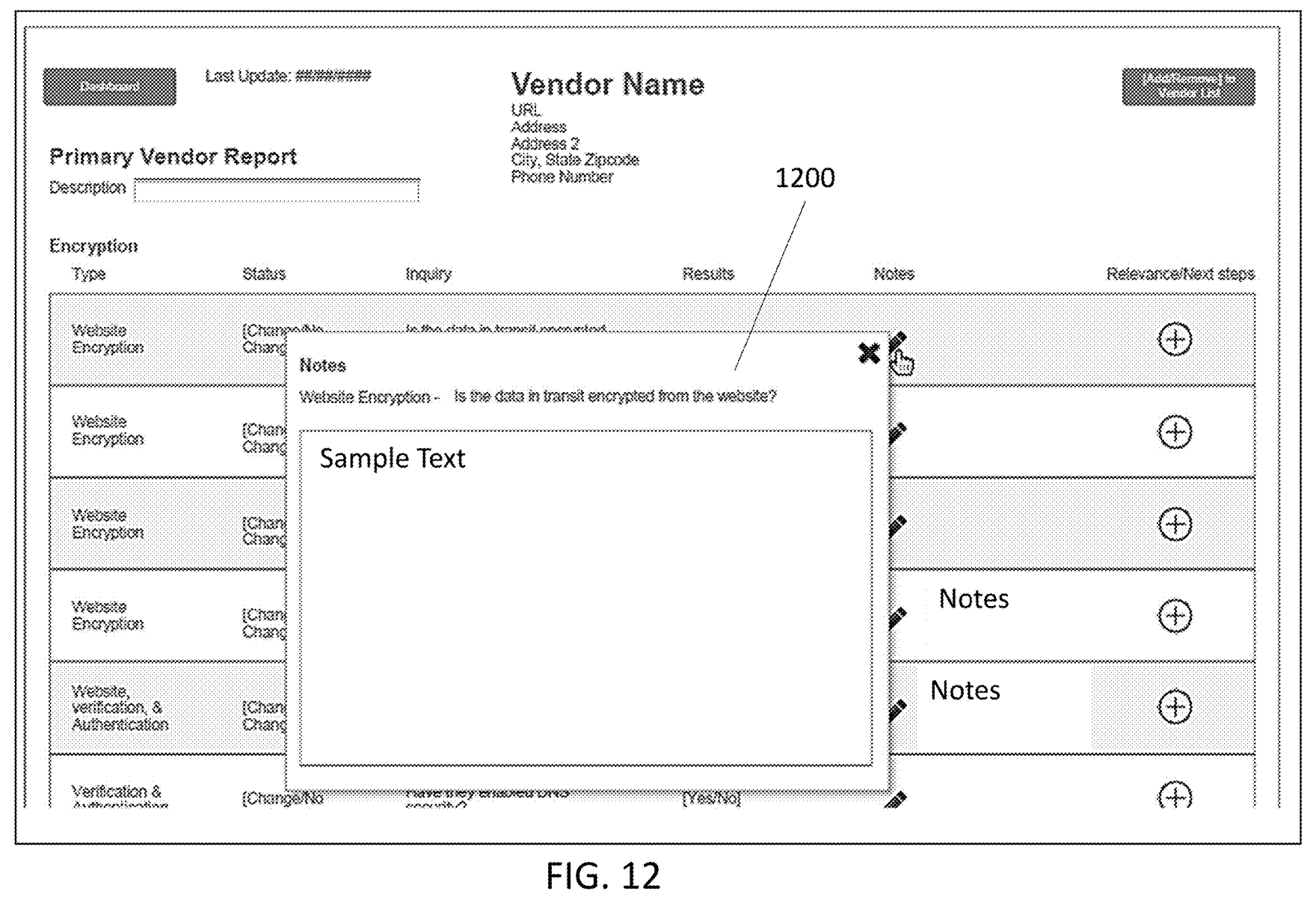

FIG. 11 illustrates an example data entry display screen 1100 that provides detailed information associated with a selected vendor. As shown in FIG. 11, information is provided to provide to a user the relevance of and how to analyze specific information. In the example shown in FIG. 11, information associated with encryption is provided which corresponds to a selection made by the user from table 602 (FIG. 6). Further, an inquiry is made regarding whether data in transit from the vendor's website are checked for privacy and security, or whether a vendor is applying a particular form of encryption, such as HSTS. Also shown in the example in FIG. 11, inquiries may be made, such as why certain protocols are not followed. Other inquiries can relate whether network environments are segmented to ensure protection of sensitive data, or whether other appropriate measures are being taken. If a user wishes to submit a particular customized question or note, a user may select a notes option from table 602 (or other relevant table shown and described herein), which is illustrated in FIG. 12 in data entry display screen 1200.

Thus, as shown and described herein, various implementations of the present disclosure include systems and methods to monitor and determine vendor compliance with at least some aspects of information and security criteria. For example, device(s) can be configured to access information and security criteria respectively associated with a vendor that provides a good and/or service. At least some aspects of the information and security criteria can be defined and/or provided by an organization considering the vendor, and can include a set of rules that are required for compliance. The information and security criteria can include at least one of cybersecurity criteria, regulatory criteria, intellectual property criteria, data management criteria, and policy criteria.

Computing device(s) can be configured to access a plurality of other remotely located computing devices to obtain information associated with the vendor's performance and operations in connection with at least some of the aspects of the information and security criteria. The device(s) can automatically evaluate vendor compliance with at least some of the aspects of the information and security criteria, including by comparing a predetermined standard or threshold of at least one of the aspects of the information and security criteria with at least some of the information obtained from the plurality of remotely located computing devices.

Further, computing devices can be configured, such as by executing one or more modules, to automatically determine that the vendor has not complied with a first subset of the aspects of the information and security criteria. The determination can be based on the results of an evaluation and determination that a vendor has or has not complied with aspects of the information and security criteria, such as whether certain privacy and data encryption methodologies are in place and operational. Based on the compliance, subsets of aspects can be defined or determined based on one or more filtering operations. Computing devices can filter aspects of the information and security criteria that the vendor did not comply with from all aspects of the information and security criteria and, thereafter, perform additional operations on the reduced filtered dataset. This improves computer functionality, including by reducing processing time, computing resources and associated costs.

More generally, in one or more implementations, at least one computing device can determine, based at least on an evaluation of the first and second subsets, whether the vendor is in compliance or is out of compliance with the information and security criteria. For example, vendor may be out of compliance with one or more specific aspects of the information and security criteria (e.g., a respective firewall setting), but is in compliance with all other respective aspects. Based on the organization's history or specific rules set forth in a profile or other resource, the vendor may be in compliance with the organization's overall hiring rules under the information and security criteria, notwithstanding the vendor not complying with one or more aspects. Alternatively, one or more additional rules can be implemented, such as timeframes for a vendor to be brought into compliance with one or more of the various aspects.

In one or more implementations, at least one computing device automatically transmits to a remotely located computing device, a report identifying that the vendor is in compliance or out of compliance with the information and security criteria. Where the vendor is determined to be out of compliance with the information and security criteria, at least one computing device can determine at least one remedial action to bring the vendor in compliance with at least one aspect of the first subset. Further, at least one computing device can identify that the at least one remedial action has been taken, and that the vendor is in compliance with the information and security criteria. An updated or new report can be transmitted, by at least one computing device to a remotely located computing device, to identify that the vendor is in compliance with the information and security criteria. The report can be transmitted to the organization and/or the vendor.

In one or more implementations, the present application includes systems and methods to monitor and determine vendor compliance with at least some aspects of information and security criteria. For example, at least one computing device is configured to access respective ones of a plurality of information and security criteria respectively associated with types of vendors that provide a good and/or service. The information and security criteria can include at least one of cybersecurity criteria, regulatory criteria, intellectual property criteria, data management criteria, and policy criteria.

For each one of the respective vendors, at least one computing device identifies aspects of the respective information and security criteria for the type of the respective vendor. Furthermore, at least one computing device can be configured, such as executing one or more modules, to access at least one remotely located computing device to obtain information associated with the respective vendor's performance in connection with at least one of the aspects. At least one computing device can be further configured, such as executing one or more modules, to automatically evaluate the respective vendor's compliance with the at least one of the aspects. Such evaluating can include comparing a predetermined standard or threshold of the at least one of the aspects and at least some of the information obtained from the at least one remotely located computing device. Still further, at least one computing device can be configured to automatically determine, as a function of the previous evaluating step, that the respective vendor is not compliant with at least one of the aspects. At least one computing device can be configured to automatically transmit to a remotely located computing device, a report identifying at least the respective vendor and the at least one of the aspects that is out of compliance.

It is to be appreciated that with respect to the various hardware and computer elements described, such processors, computing elements and microprocessors are, in one or more implementations, connected, directly or indirectly, to one or more memory storage devices (memories). The memory is a persistent or non-persistent storage device that is operative to store an operating system for a processor in addition to one or more of software modules. In accordance with one or more embodiments, the memory comprises one or more volatile and/or non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. The computer memories may also comprise secondary computer memory, such as magnetic or optical disk drives or flash memory, that provide long term storage of data in a manner similar to the persistent memory device. In one or more embodiments, the memories of the processors provide for storage of application programs and data files when needed.

It will be further appreciated that computers, processors or computing devices described herein can communicate with the one or more remote networks using USB, digital input/output pins, eSATA, parallel ports, serial ports, FIREWIRE, Wi-Fi, Bluetooth, or other communication interfaces. In a particular configuration, computing devices, processors or computers provided herein may be further configurable through hardware and software modules so as to connect to one or more remote servers, computers, peripherals or other hardware using standard or custom communication protocols and settings (e.g., TCP/IP, etc.) either through a local or remote network or through the Internet. Computing devices, processors or computers provided herein may utilizes wired or wireless communication means, such as, but not limited to CDMA, GSM, Ethernet, Wi-Fi, Bluetooth, USB, serial communication protocols and hardware to connect to one or more access points, exchanges, network nodes or network routers.

It should be further appreciated that, with respect to each and every component of the systems, methods and apparatus described herein, each component may be separated into more elements, or two or more components may be combined together into a single element. Moreover, each component may be replicated to support the execution of the corresponding operations in parallel. Moreover, unless specified otherwise, any interaction between different components generally does not need to be continuous, and it may be either direct or indirect through one or more intermediaries.

One aspect of the present disclosure includes a system, method, and/or computer program product configured to implement the functionality provided in this disclosure and the associated drawings. In implementations utilizing a computer program, the computer program may include a computer readable storage medium (or media) having computer readable program instructions thereon for causing a processor to carry out aspects of the disclosure provided herein. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations to implement any functionality described herein may be encoded in assembler instructions, instruction-set-architecture (ISA) instructions, machine instructions, machine dependent instructions, microcode, firmware instructions, state-setting data, or either source code or object code written in any combination of one or more standard, custom, proprietary or modified programming language such as a standard set, subset, superset or extended set of JavaScript, PHP, Ruby, Scala, Erlang, C, C++, Objective C, Swift, C#, Java, Assembly, Go, Python, Perl, R, React, Visual Basic, Lisp, or Julia or any other object oriented, functional or other paradigm based programming language.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to a non-limiting set of implementations. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via a processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the systems, platforms and approaches described herein. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

Publications and references to various known systems maybe cited throughout this application, the disclosures of which are incorporated herein by reference. Citation of any publications or documents is not intended as an admission that any of them is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details.

Although the foregoing invention has been described in detail for purposes of clarity of understanding, it will be apparent that certain changes and modifications can be practiced within the scope of the appended claims. Accordingly, the present embodiments are to be considered as illustrative and not restrictive, and the invention is not to delimit to the details given herein but may be modified within the scope and equivalents of the appended claims.

What is claimed:

1. A computer-implemented method to monitor and determine vendor compliance with at least some aspects of information and security criteria, the method comprising:
   accessing, by at least one computing device, information and security criteria respectively associated with a vendor that provides a good and/or service, wherein at least some aspects of the information and security criteria are provided by an organization considering the vendor, and further wherein the information and security criteria include at least one of cybersecurity criteria, regulatory criteria, intellectual property criteria, data management criteria, and policy criteria;
   accessing, by at least one computing device, a plurality of remotely located computing devices to obtain information associated with the vendor's performance in connection with the at least some of the aspects of the information and security criteria;
   automatically evaluating, by at least one computing device, the vendor's compliance with the at least some of the aspects of the information and security criteria, wherein the evaluating includes comparing a predetermined standard or threshold of at least one of the aspects of the information and security criteria and at least some of the information obtained from the plurality of remotely located computing devices;
   automatically determining, by at least one computing device as a function of the evaluating, that the vendor has not complied with a first subset of the aspects of the information and security criteria, wherein the first subset includes at least one of the aspects of the information and security criteria;
   automatically determining, by at least one computing device as a function of the evaluating, that the vendor has complied with a second subset of the aspects of the information and security criteria, wherein the second subset includes at least one other of the aspects of the information and security criteria;
   determining, by at least one computing device based at least on an evaluation of the first subset and the second subset, whether the vendor is in compliance or is out of compliance with the information and security criteria; and
   automatically transmitting, by at least one computing device to a remotely located computing device, a report identifying that the vendor is in compliance or out of compliance with the information and security criteria.

2. The computer-implemented method of claim 1, further comprising:
   where the vendor is determined to be out of compliance with the information and security criteria:
   determining, by at least one computing device, at least one remedial action to bring the vendor in compliance with at least one aspect of the first subset.

3. The computer-implemented method of claim 2, further comprising:
   identifying, by at least one computing device, that the at least one remedial action has been taken;
   determining, by at least one computing device that the vendor is in compliance with the information and security criteria; and
   automatically transmitting, by at least one computing device to a remotely located computing device, a report identifying that the vendor is in compliance with the information and security criteria.

4. The computer-implemented method of claim 1, wherein the information and security criteria are specific to a plurality of information and security criteria associated with categories of vendor types.

5. The computer-implemented method of claim 1, further comprising:
   transmitting, by at least one computing device, the report to at least one computing device associated with the vendor and/or the organization.

6. The computer-implemented method of claim 1, further comprising:
   automatically generating, by at least one computing device as a function of the determining that the vendor is in compliance or out of compliance with the information and security criteria, the report.

7. The computer-implemented method of claim 1, wherein the information and security criteria are obtained from a stored profile obtained from the organization.

8. The computer-implemented method of claim 1, wherein the step of determining whether the vendor is in compliance is based on a historical evaluation of the organization and the information and security criteria.

9. The computer-implemented method of claim 1, where the vendor is determined to be out of compliance with the information and security criteria, the report further identifies at least one of the aspects that is out of compliance.

10. The computer-implemented method of claim 1, wherein the information and security criteria include a set of rules provided from the organization.

11. A computer-implemented system to monitor and determine vendor compliance with at least some aspects of information and security criteria, the system comprising:
at least one computing device configured by executing code to access information and security criteria respectively associated with a vendor that provides a good and/or service, wherein at least some aspects of the information and security criteria are provided by an organization considering the vendor, and further wherein the information and security criteria include at least one of cybersecurity criteria, regulatory criteria, intellectual property criteria, data management criteria, and policy criteria;
the at least one computing device further configured to access a plurality of remotely located computing devices to obtain information associated with the vendor's performance in connection with the at least some of the aspects of the information and security criteria;
the at least one computing device further configured to automatically evaluate the vendor's compliance with the at least some of the aspects of the information and security criteria, wherein the evaluating includes comparing a predetermined standard or threshold of at least one of the aspects of the information and security criteria and at least some of the information obtained from the plurality of remotely located computing devices;
the at least one computing device further configured to automatically determine, as a function of the evaluating, that the vendor has not complied with a first subset of the aspects of the information and security criteria, wherein the first subset includes at least one of the aspects of the information and security criteria;
the at least one computing device further configured to automatically determine, as a function of the evaluating, that the vendor has complied with a second subset of the aspects of the information and security criteria, wherein the second subset includes at least one other of the aspects of the information and security criteria;
the at least one computing device further configured to determine, based at least on an evaluation of the first subset and the second subset, whether the vendor is in compliance or is out of compliance with the information and security criteria; and
the at least one computing device further configured to automatically transmit, to a remotely located computing device, a report identifying that the vendor is in compliance or out of compliance with the information and security criteria.

12. The computer-implemented system of claim 11, in the event that the at least one computing device determines that the vendor is out of compliance with the information and security criteria:
the at least one computing device further configured to determine at least one remedial action to bring the vendor in compliance with at least one aspect of the first subset.

13. The computer-implemented system of claim 12, further comprising:
the at least one computing device further configured to identify that the at least one remedial action has been taken;
the at least one computing device further configured to determine that the vendor is in compliance with the information and security criteria; and
the at least one computing device further configured to automatically transmit, to a remotely located computing device, a report identifying that the vendor is in compliance with the information and security criteria.

14. The computer-implemented system of claim 11, wherein the information and security criteria are specific to a plurality of information and security criteria associated with categories of vendor types.

15. The computer-implemented system of claim 11, further comprising:
the at least one computing device further configured to transmit the report to at least one computing device associated with the vendor and/or the organization.

16. The computer-implemented system of claim 11, further comprising:
the at least one computing device further configured to automatically generate, as a function of the determining, that the vendor is in compliance or out of compliance with the information and security criteria, the report.

17. The computer-implemented system of claim 11, wherein determining whether the vendor is in compliance is based on a historical evaluation of the organization and the information and security criteria.

18. The computer-implemented system of claim 11, where the vendor is determined to be out of compliance with the information and security criteria, the report further identifies at least one of the aspects that is out of compliance.

* * * * *